United States Patent [19]

Hempelmann

[11] Patent Number: 4,683,629
[45] Date of Patent: Aug. 4, 1987

[54] SIMULATED WIRE WHEEL TRIM

[75] Inventor: Heinrich J. Hempelmann, Livonia, Mich.

[73] Assignee: NI Industries, Inc., Novi, Mich.

[21] Appl. No.: 726,138

[22] Filed: Apr. 23, 1985

Related U.S. Application Data

[63] Continuation-in-part of Ser. No. 688,328, Jan. 2, 1985.

[51] Int. Cl.$^4$ .............................................. B21K 1/28
[52] U.S. Cl. .................................... 29/159 A; 29/513; 29/453
[58] Field of Search ................ 29/159 A, 159.02, 513, 29/446, 453; 301/375 S, 375 C

[56] References Cited

U.S. PATENT DOCUMENTS

| | | | |
|---|---|---|---|
| 1,868,108 | 7/1932 | Lachman | 29/513 |
| 3,286,416 | 11/1966 | Ashworth | 29/513 |
| 4,168,016 | 9/1979 | Marshall, Jr. | 301/375 S |
| 4,229,048 | 10/1980 | Brinson | 301/375 S |
| 4,387,494 | 6/1983 | McClure | 29/159 A |
| 4,430,786 | 2/1984 | Connell | 29/159 A |
| 4,452,493 | 6/1984 | Liggett | 301/375 C |
| 4,509,239 | 4/1985 | Liggett | 29/159 A |
| 4,577,909 | 3/1986 | Browning | 301/37 TP |

FOREIGN PATENT DOCUMENTS 2818268 2/1979 Fed. Rep. of Germany .
2118491A 11/1983 United Kingdom .

OTHER PUBLICATIONS

NI Industries', Drawing No. 555862, 1983.

Primary Examiner—Percy W. Echols
Attorney, Agent, or Firm—Harness, Dickey & Pierce

[57] ABSTRACT

An improved construction and method of assembly for forming a simulated wire wheel trim is disclosed herein which employs axially inner and outer spoke retainer plate members which are secured together subsequent to assembly of spoke members thereto and operate to securely clamp the spoke members therebetween. The axially outer spoke retainer plate member is provided with a plurality of circumferentially spaced openings which are designed to loosely receive the radially inner ends of the spoke members before the radially outer ends thereof have been inserted in the openings provided in the outer ring assembly. Once the radially outer ends of the spoke members have been inserted and appropriately spaced openings provided in the outer ring assembly, the axially inner spoke retainer plate is assembled to the axially outer spoke retainer plates and operates to exert a generally axially and radially outwardly biasing action on the radially inner ends of the spoke members so as to secure them in position within the openings provided in the outer ring member as well as to exert a clamping action thereon so as to prevent any noise generating rattle thereof.

9 Claims, 4 Drawing Figures

SIMULATED WIRE WHEEL TRIM

CROSS REFERENCE TO RELATED APPLICATION

This application is a continuation-in-part of U.S. application Ser. No. 688,328, filed Jan. 2, 1985, entitled "Simulated Wire Wheel Trim" which is assigned to the same assignee as the present application.

BACKGROUND AND SUMMARY OF THE INVENTION

The present invention relates generally to simulated wire wheel trim and more particularly to an improved construction and method for assembling such simulated wire wheel trim.

Simulated wire wheel trim have become very popular ornamentations for the axially outer surfaces of vehicle wheels. The general objective sought to be achieved in designing such simulated wire wheel trim is to create a realistic appearing simulation of a wire wheel as well as to minimize the weight of such trim so as to avoid undesirable excessive increases in the unsprung weight of the vehicle itself. Additionally, such simulated wire wheel trim should also provide for a secure, noise-free clamping of the individual spoke members so as to avoid the possibility of annoying noise being generated by the wheel trim itself. In order to minimize the costs associated with such wheel trim, it is also extremely desirable to provide a design which may be easily and rapidly assembled with a minimum number of parts being required.

The present invention achieves these often conflicting objectives by providing a simulated wire wheel trim which employs axially inner and outer spoke retainer plates which are designed to be secured together by means of integrally formed fastening means and which operate to provide both a camming action to insure a secure engagement of the radially outer ends of the spoke members with an annular outer ring member as well as to maintain a secure clamping force on the spoke members so as to preclude the possibility of annoying noise being generated thereby. The design of the present invention employs radially aligned openings in both a decorative outer retainer member and an axially outer spoke retainer plate through which the radially inner ends of spoke members may be easily and loosely inserted prior to insertion of the radially outer ends into the openings provided in the outer ring assembly. Thereafter the radially outer ends may be inserted into the appropriate openings provided in the outer ring assembly after which an axially inner retaining plate is assembled to the axially outer retaining plate and operates to provide both a camming action to insure and maintain secure engagement of the radially outer ends of the spoke members with the annular ring member as well as an axially outwardly directed clamping force which in cooperation with the axially outer spoke retainer plate member provides a secure, rattle-free clamping action of the spoke members. Both the outer decorative retainer member and the axially outer spoke retainer plate and provided with integrally formed securing means whereby the entire assembly may be secured together without the need for utilizing separate fastening means.

Additional advantages and features of the present invention will become apparent from the subsequent description and the appended claims taken in conjunction with the accompanying drawings.

DESCRIPTION OF THE PREFERRED EMBODIMENT

Figure 1:
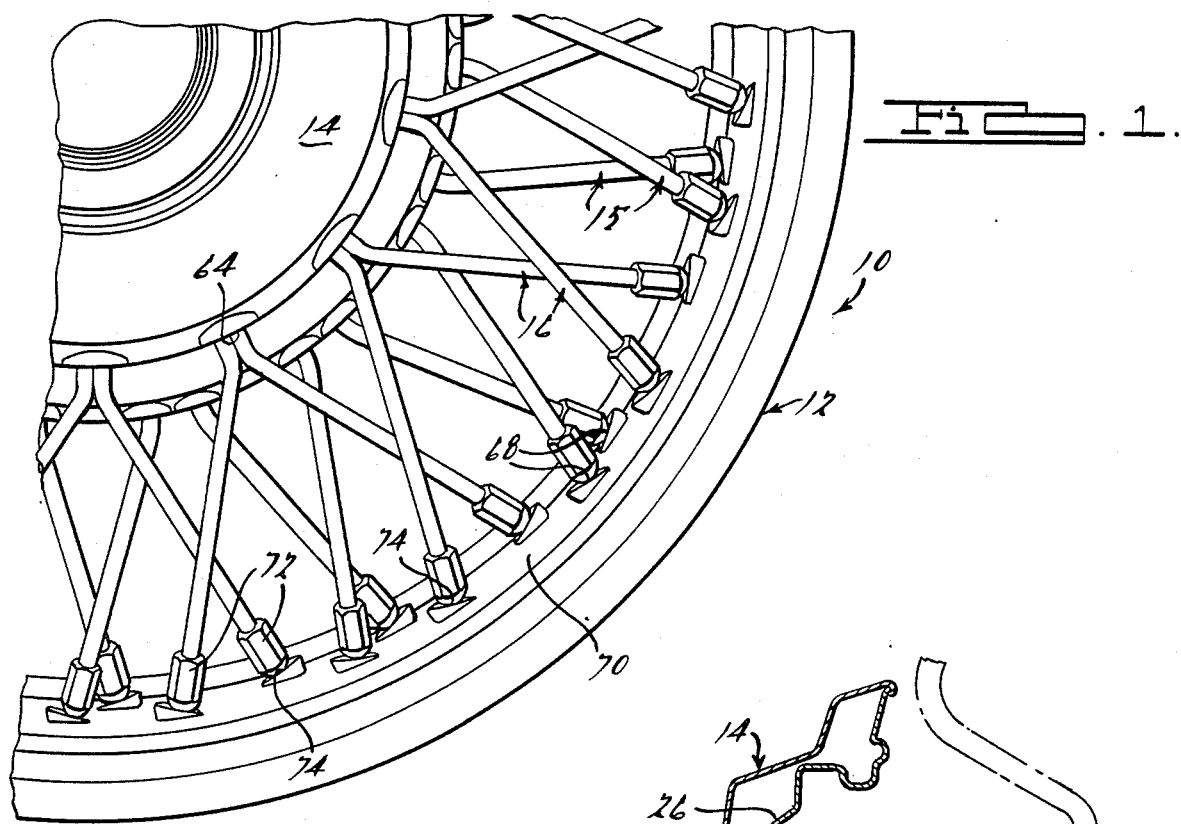
FIG. 1 is a fragmentary view of a portion of a simulated wire wheel trim in accordance with the present invention as seen looking in an axially inwardly direction.

Referring now to the drawings, there is shown a simulated wire wheel trim in accordance with the present invention indicated generally at 10. Simulated wire wheel trim 10 comprises an outer annular ring assembly 12 and an inner center hub assembly 14 interconnected by a plurality of generally radially extending spoke members 15 and 16 arranged to define axially inner and outer layers at their radially inner ends respectively. Except as described in greater detail below, simulated wire wheel trim 10 is substantially identical in construction to the simulated wire wheel trim disclosed in copending application Ser. No. 688,328 entitled "Simulated Wire Wheel Trim" filed Jan. 2, 1985 and assigned to the same assignee as the present application, the disclosure of which is hereby incorporated by reference.

Figure 2:
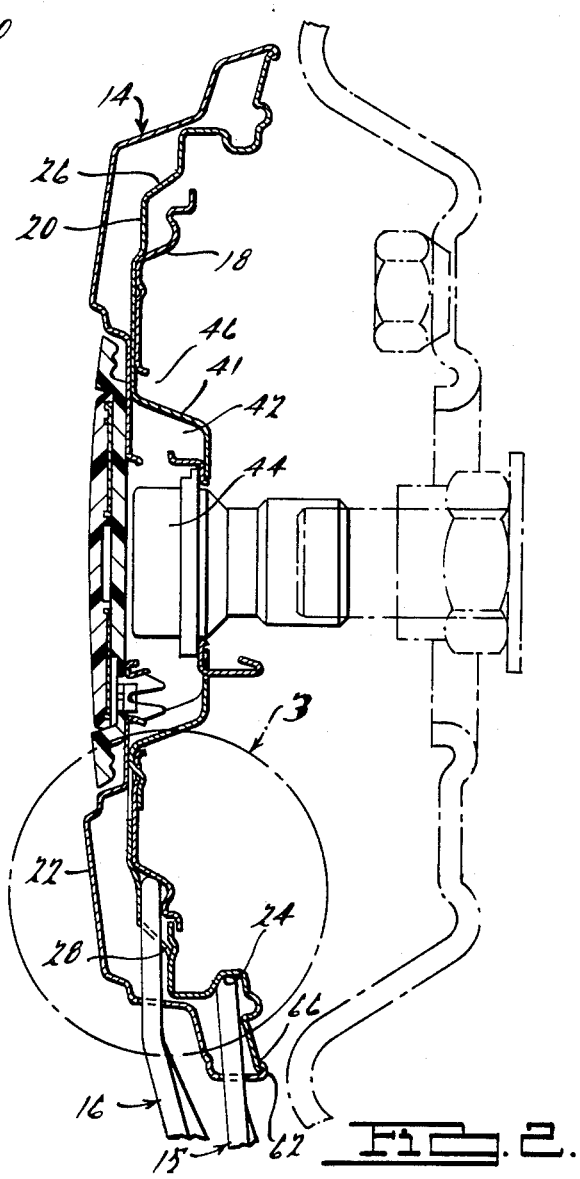
FIG. 2 is a fragmentary section view of the center portion of the wheel trim shown in FIG. 1, the section being taken along a radial plane extending along the axis of rotation.

As best seen with reference to FIG. 2, center hub assembly 14 comprises axially inner and outer spoke retainer plates 18 and 20 which are designed to be secured together and cooperate to secure the radially inner ends of the axially outer layer of spoke members 16. An axially outer decorative retainer member 22 is also provided which is positioned in overlying relationship to the axially outer retainer plate 20 and is secured thereto and cooperates therewith to clamp the radially inner ends of an axially inner layer of spoke members 15.

Figure 3:
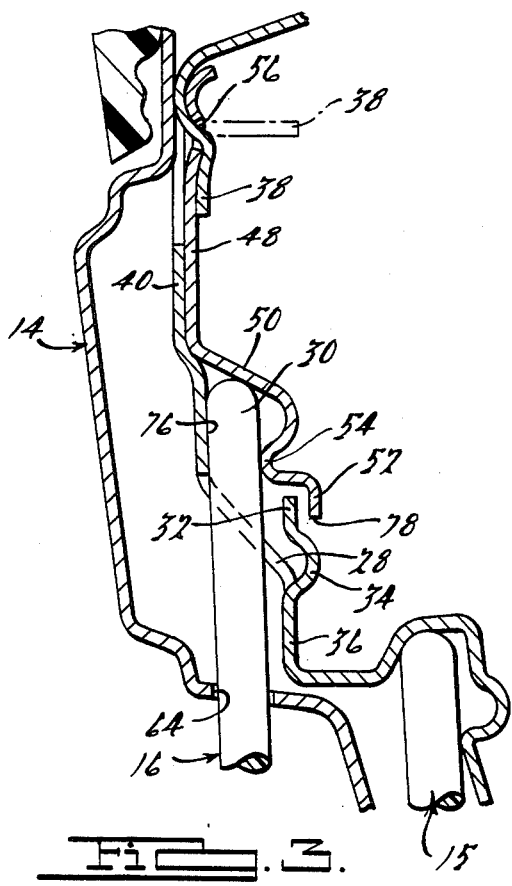
FIG. 3 is an enlarged fragmentary section view of the portion of the wheel trim enclosed within the circle 3 of FIG. 2.

The axially outer spoke retainer plate 20 is generally circular in shape and has an irregular cross-sectional configuration generally as shown in FIG. 2 which includes an annular recess 24 adjacent the axially inner and radially outer edge thereof and a generally conically extending radially outwardly facing sidewall portion 26 spaced radially inwardly and axially outwardly from recess 24. An annular array of a plurality of openings 28 are provided in circumferentially spaced relationship around this radially outwardly facing surface 26 and are sized so as to loosely accommodate the radially inner ends 30 of the axially outer layer of spoke members 16. In a preferred embodiment, this opening is formed by means of a lancing or piercing operation and the severed portion is deflected radially and axially inward so as to form a generally radially inwardly extending tab portion 32. In this preferred embodiment, generally radially inwardly extending tab portion 32 will be provided with a generally axially inwardly extending protrusion 34 thereon adjacent its juncture with a generally radially extending flange portion 36 of the axially outer retainer plate 20. Additionally, axially outer retainer plate 20 will have a plurality of circumferentially spaced tab portions 38 lanced from a generally axially outwardly positioned radially extending annular flange portion 40 thereof, the tab portions 38 being initially bent so as to project in an generally axially inward direction (as shown in phantom in FIG. 3) from the radially inner ends thereof. Axially outer retainer plate also has formed therein a central depressed or axially inwardly extending portion 41 defining cavity 42 which is designed to receive a fastener 44 forming a part of the center retention system employed therein.

Figure 4:
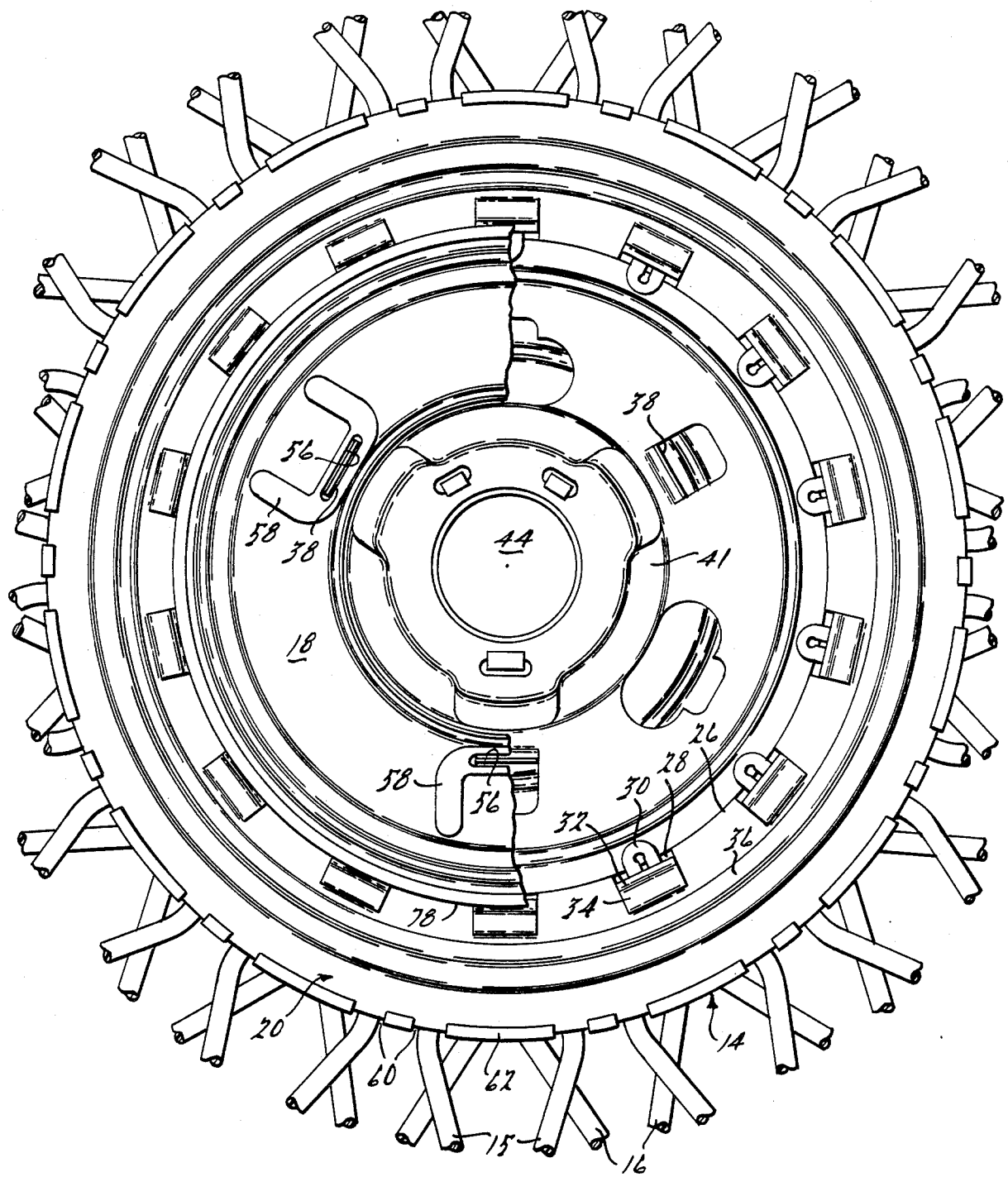
FIG. 4 is a fragmentary view of the center portion of the wheel trim of FIG. 1 with portions thereof broken away as seen looking in an axially outward direction.

The axially inner spoke retainer plate 18 is also of a generally circular configuration and includes a relatively large diameter central opening 46 therein through which depressed portion 41 of the axially outer retainer plate 20 is designed to project. An annular generally planar radially extending flange portion 48 projects outwardly from this opening 46 and terminates at its outer end at an integrally formed generally conically shaped flange portion 50 extending generally axially inwardly and radially outwardly. The inner end of this conical flange portion 50 terminates in an integrally formed generally radially outwardly extending flange portion 52 on which is formed a generally axially outwardly projecting annular rib or protrusion 54. As best seen with reference to FIGS. 3 and 4, a plurality of circumferentially spaced slots 56 are provided in flange portion 48 adjacent the radially inner edge thereof through which tab portions 38 are designed to project when axially inner spoke retainer plate 18 is assembled to the axially outer spoke retainer plate. Preferably, each of these slots 56 will be formed in the center portion of a generally U-shaped reinforcing embossment 58 formed on flange portion 48.

The decorative axially outer retainer member 22 may be of any desired cross sectional shape so as to create the intended aesthetic appearance and will typically include a plurality of circumferentially spaced slots 60 extending axially outwardly from the axially inner and radially outer peripheral edge 62 thereof through which the radially inner ends of the axially inner layer of spoke members 15 are designed to project. An axially outwardly spaced annular array of openings 64 is provided in member 22 through which the axially outer layer of spoke members 16 extend into engagement with the axially inner and outer spoke retainer plates 18 and 20. As best seen with reference to FIG. 2 and as more fully described in the aforementioned copending application, the segmented outer peripheral edge 62 of the decorative retainer member 22 is provided with a reversely bent peripheral flange portion which is designed to lockingly engage the peripheral edge 66 of the axially outer retainer plate 20 so as to retain the two members in assembled relationship.

In assembling the simulated wire wheel trim of the present invention, the axially outer retainer plate member 20 is first positioned in generally coaxial relationship with respect to the outer annular ring assembly 12. Thereafter, the radially outer ends of the axially inner layer of spoke members 15 are inserted in appropriate openings 68 provided in the generally axially extending flange portion 70 of the outer ring assembly 12. Thereafter, the radially inner ends of these axially inner spoke members 15 are snapped into the annular groove 24 provided on the axially outer retainer plate member 20. Once this axially inner layer of spoke members 15 has been fully assembled, the decorative outer retainer member 22 is positioned in overlying relationship to the axially outer spoke retainer member 20 with the axially inner layer of spokes being received within the appropriately positioned grooves 60 provided in the radially outer peripheral edge 62 thereof. The decorative retainer member is then moved axially toward the axially outer retainer plate 20 so as to cause the reversely bent flange portions to overengage and lock onto the peripheral edge portion 66 of the axially outer spoke retainer plate member 20.

Next the radially inner ends 30 of the axially outer layer of spoke members 16 are inserted through the openings 64 provided in the decorative retainer member 22 inwardly and through the radially aligned openings 28 provided in the axially outer spoke retainer plate 20. Preferably the relative sizing of these respective openings 64 and 28 will be such as to loosely receive and easily enable the spoke members 16 to be moved radially inwardly a distance greater than their final assembled position. Thereafter the radially outer ends 72 of the axially outer spoke members 16 will be moved into aligned position with and inserted into appropriately spaced openings 74 provided on the axially inwardly extending flange portion 70 of the outer ring assembly 12. Once this assembly operation has been completed and all of the axially outer layer of spoke members 16 have been assembled, the axially inner spoke retainer member 18 will be positioned in overlying relationship to the axially inner surface portion of the axially outer retainer member 20 and with tabs 38 projecting through slots 56. The two retainer plates 18 and 20 are then pressed axially toward each other whereby the outer surface of generally conically shaped flange portion 50 of the axially inner retainer plate member 18 will engage the respective radially inner ends 30 of the axially outer layer of spoke members 16 and operate to provide a camming action urging them in both a radially outward and axially outward direction thereby insuring that these spoke members are fully seated within the openings 74 provided in the outer ring assembly 12 as well as urging them into engagement with a generally axially inwardly facing surface portion 76 of the axially outer spoke retainer plate member 20. In order to insure a secure clamping engagement between the radially inner ends 30 of spoke members 16 and the axially outer spoke retainer plate 20, annular protrusion 54 provided on the axially inner retainer plate 18 is designed to engage the respective spoke members 16 adjacent the radially inner end thereof and further urge same in a generally axially outward direction. This engagement operates to assure a secure rattle-free clamping action of the radially inner ends 30 of the spoke members 16 therebetween. Once the axially inner and outer spoke retainer plate members 18 and 20 have been securely clamped together, the respective circumferentially spaced tab portions 38 projecting through the openings 56 provided in the axially inner spoke retainer plate member 18 may be deformed radially outwardly and into overlying engagement with the axially inner surface of the axially inner spoke retainer plate member 18 so as to thereby secure the respective plate members in assembled relationship.

Preferably, axially inner spoke retainer plate 18 will be suitably dimensioned and contoured such that when the axially outer surface of flange portion 48 abuts the axially inner surface of flange portion 40, conical flange portion 50 and flange portion 52 of axially inner spoke retainer plate 18 will be deflected slightly whereby a secure clamping force will be maintained on the radially inner ends 30 of spoke members 16. This arrangement thus provides for a relatively simple, straightforward structure whereby both axially inner and outer layers of spoke members may be easily assembled to and support a center hub assembly.

Thus, as may now be apparent, the present invention provides a realistic simulated wire wheel trim which may be entirely fabricated from relatively lightweight sheet metal parts and which may be relatively simple and easily assembled. It should also be noted that the resulting structure requires absolutely no external fastening means in order to secure the center hub in assembled relationship as the securing means are integrally formed on the respective decorative retainer member and axially outer spoke retainer plate members.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A method of assembling a simulated wire wheel trim comprising an outer ring having a plurality of holes therethrough, a plurality of spokes, and a center assembly including an axially inner spoke retainer plate, and axially outer spoke retainer plate and a decorative outer plate member, said axially outer spoke retainer plate and said decorative plate member having a plurality of circumferentially spaced openings provided therein, said method comprising the steps of:
    (a) positioning said axially outer spoke retainer plate on the center axis of said ring;
    (b) inserting radially inner portions of said spokes into respective of said openings in said axially outer spoke retainer plate and said decorative plate member;
    (c) aligning the radially outer ends of said spokes with respective of said openings in said outer ring;
    (d) moving said spokes radially outwardly with respect to said openings in said axially outer spoke retainer plate so as to position the radially outer ends of said spokes within said openings in said outer ring; and
    (e) assembling said axially inner spoke retainer plate to said axially outer spoke retainer plate and said decorative plate member whereby radially inward movement of said spokes is restricted.

2. A method of assembling a simulated wire wheel trim as set forth in claim 1 further comprising the step of securing said axially inner and outer spoke retainer plates together so as to exert a clamping action on the radially inner end portions of said spokes.

3. A method of assembling a simulated wire wheel trim as set forth in claim 2 wherein said axially outer spoke retainer plate includes integrally formed axially inwardly projecting tab portions and said securing step comprises deforming said tab portions into overlying engagement with the axially inner surface of said axially inner spoke retainer member.

4. A method of assembling a simulated wire wheel trim as set forth in claim 1 further comprising the step of forming said openings in said axially outer spoke retainer plate of a size to loosely receive said radially inner portions of said spokes.

5. A method of assembling a simulated wire wheel trim as set forth in claim 1 wherein said axially outer decorative plate member has outer peripheral reversely bent flange portions, said method comprising pressing said decorative plate member and said axially outer spoke retainer plate together thereby causing said reversely bent flange portions to snap over and lockingly engage the outer peripheral edge of said axially outer spoke retainer plate.

6. A method of assembling a simulated wire wheel trim as set forth in claim 5 wherein said spoke members are inserted through said openings in said decorative plate member and into said openings in said axially outer spoke retainer plate subsequent to assembly of said axially outer spoke retainer plate and said decorative member.

7. A method of assembling a simulated wire wheel trim comprising an outer ring having a plurality of holes therethrough, a plurality of spokes and a center hub assembly including axially inner and outer spoke retainer plates having a generally radially outwardly facing annular surface portion and an outer decorative plate member, said axially outer spoke retainer plate and decorative plate member each having a plurality of alignable openings therethrough said method comprising the steps of:
    aligning said openings in said decorative plate member with said openings in said axially outer retainer plate;
    inserting a radially inner portion of each of said spokes through respective of said aligned openings;
    thereafter inserting the radially outer ends of each of said spokes into respective ones of said openings in said outer ring;
    assembling said axially inner retainer plate to said axially outer retainer plate with said radially outwardly facing surface portion positioned radially inwardly of the radially inner ends of said spoke members so as to restrict radial inward movement thereof; and
    securing said axially inner and outer spoke retainer plates together.

8. A method of assembling a simulated wire wheel trim as set forth in claim 7 further comprising the step of pressing said inner and outer spoke retainer plates together so as to exert a clamping action on said radially inner ends of said spokes, said securing step being performed to maintain said clamping action.

9. A method of assembling a simulated wire wheel trim as set forth in claim 8 wherein said axially outer spoke retainer plate includes a plurality of spaced axially inwardly projecting tab members and said axially inner and outer spoke retainer plates are secured by deforming said tabs into overlying engaging relationship with an axially inner surface of said axially inner retainer plate.

* * * * *